Feb. 12, 1946.    O. H. FLOYD    2,394,966
PHOTOGRAPHIC LIGHTING APPARATUS
Filed Oct. 30, 1941    3 Sheets-Sheet 1
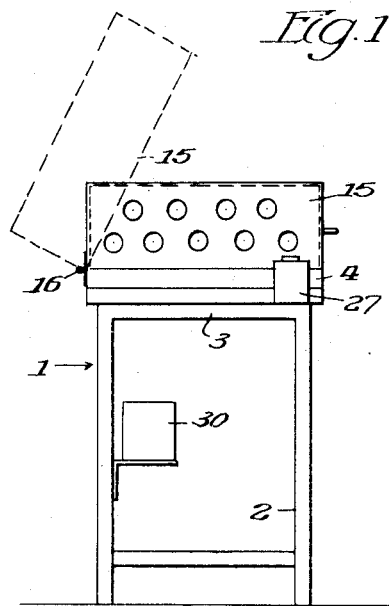
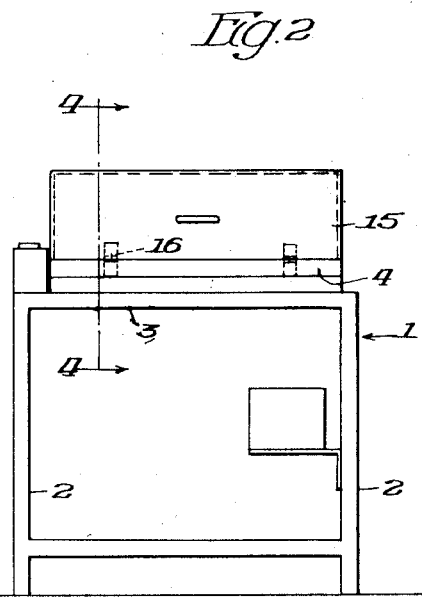
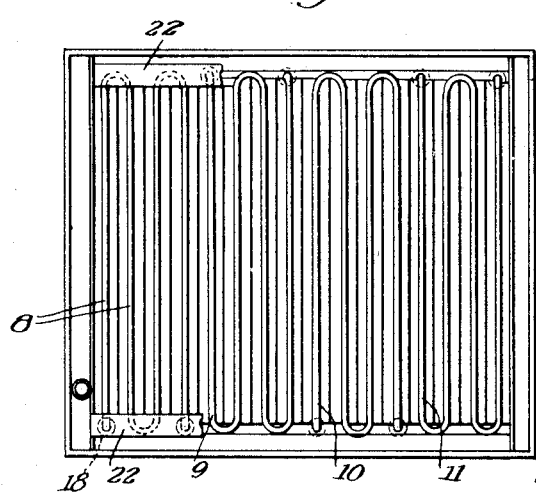
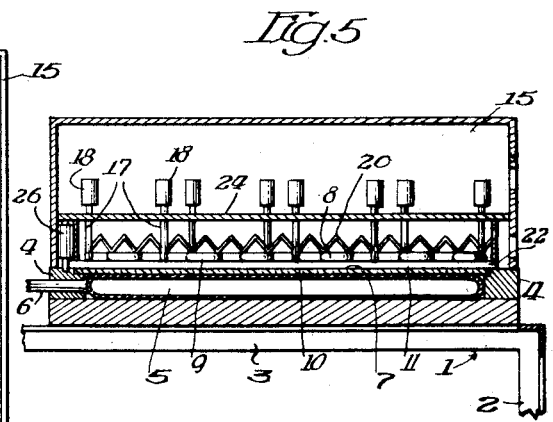
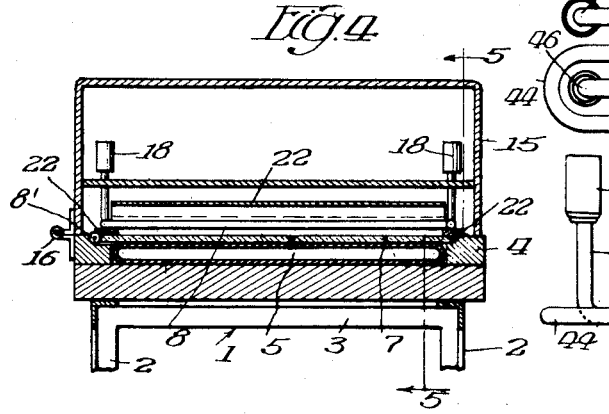
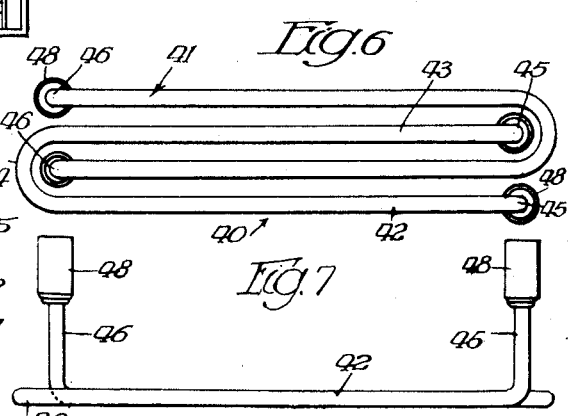
Inventor
Oscar H. Floyd
By Morros Spector
Atty.

Feb. 12, 1946.   O. H. FLOYD   2,394,966
PHOTOGRAPHIC LIGHTING APPARATUS
Filed Oct. 30, 1941   3 Sheets-Sheet 2
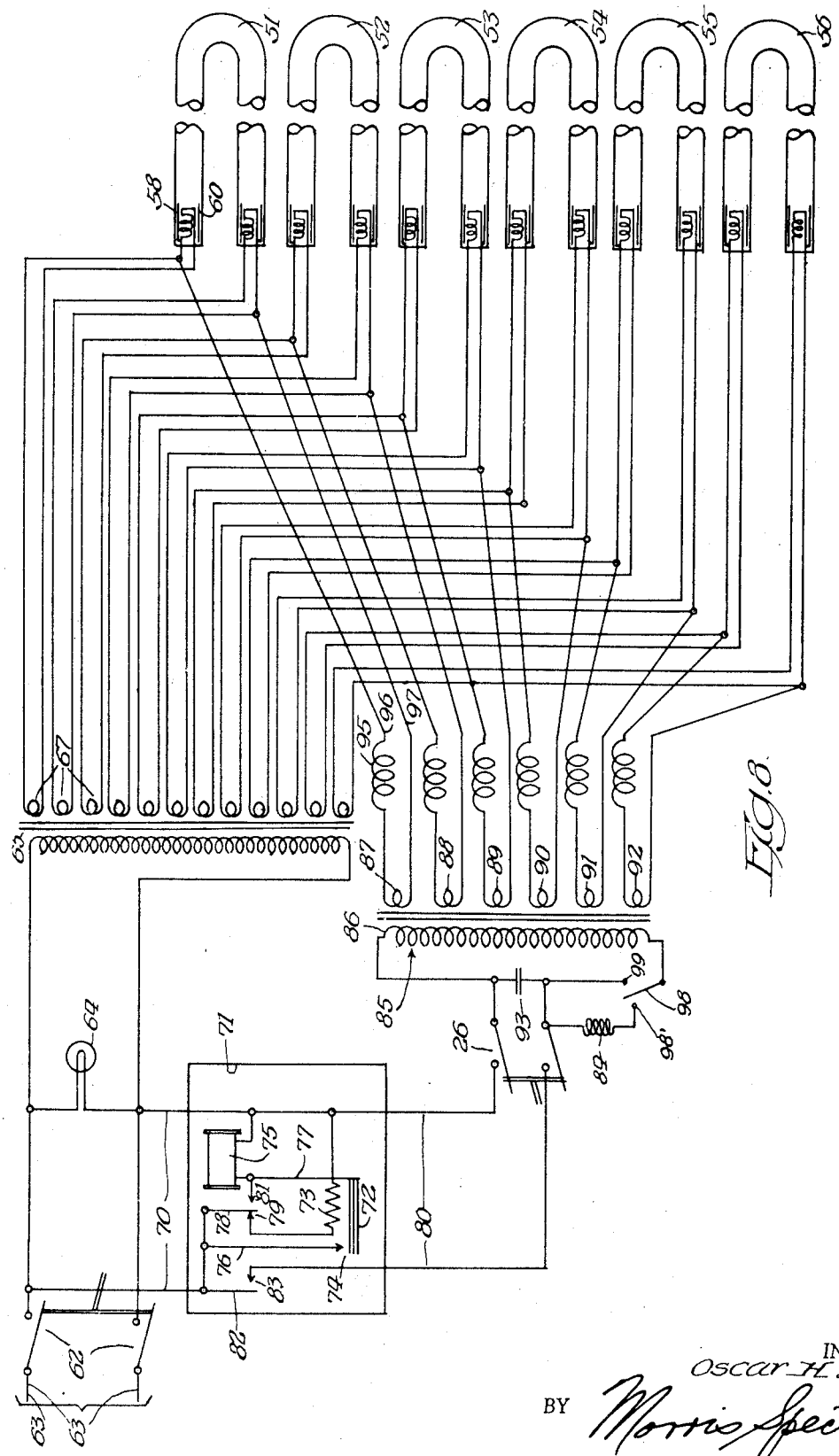
INVENTOR.
Oscar H. Floyd
BY Morris Spector
Atty.

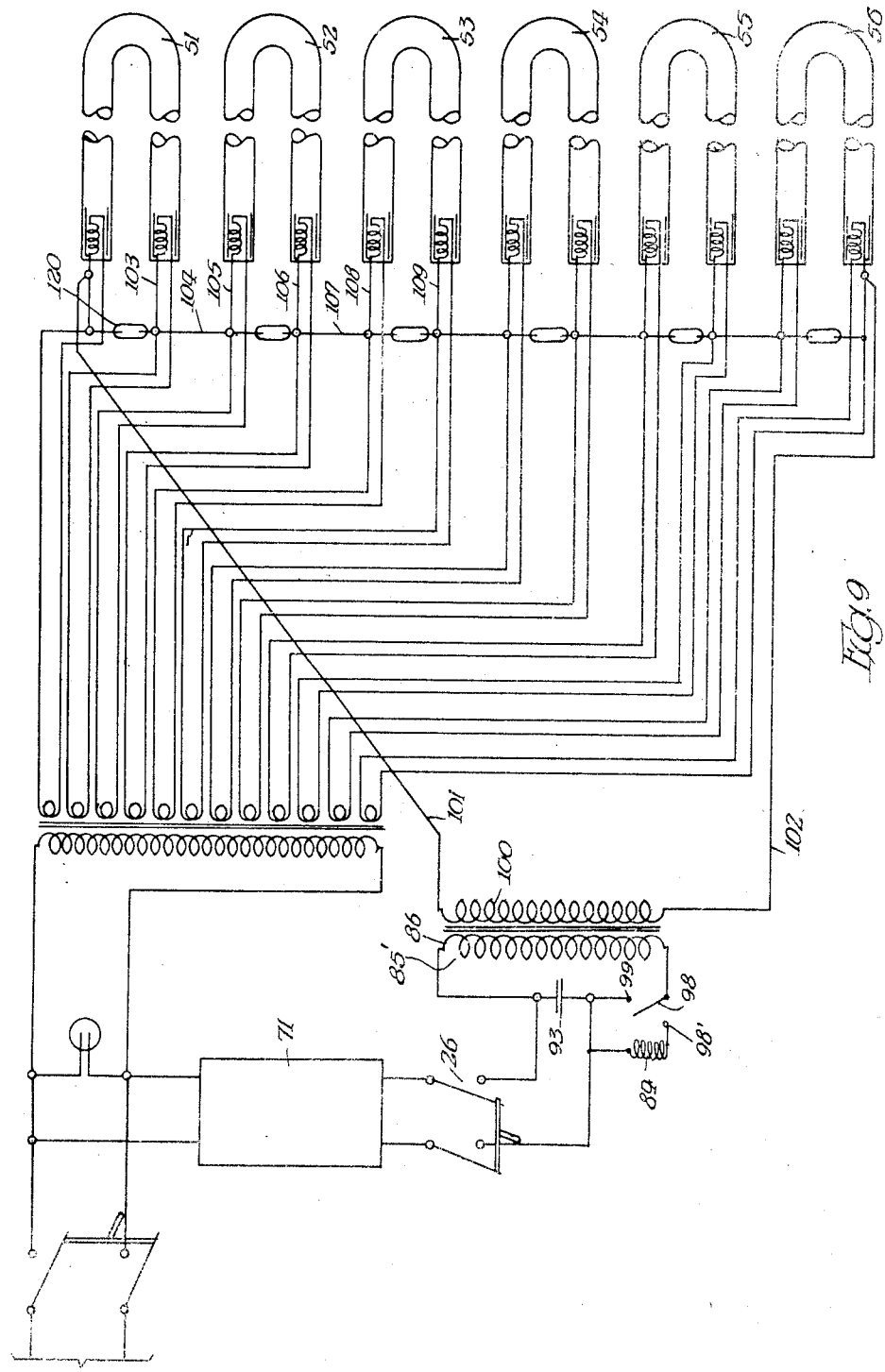

Patented Feb. 12, 1946

2,394,966

UNITED STATES PATENT OFFICE 2,394,966

PHOTOGRAPHIC LIGHTING APPARATUS

Oscar H. Floyd, Chicago, Ill., assignor to Kemlite Laboratories, Chicago, Ill., a partnership Application October 30, 1941, Serial No. 417,109

6 Claims. (Cl. 315—102)

This invention relates to photographic apparatus and more particularly to apparatus for photographic printing.

It is one of the objects of the present invention to provide an improved photographic printing apparatus, such as is particularly adapted for contact printing, which apparatus will be economical in construction and in operation, which will not give off a tremendous amount of heat, and which will be reliable in its action.

The ordinary light source for contact printing of half tones or the like is an electric arc lamp usually placed several feet from the frame. This has several well known objections, such as excessive heat, troublesome carbons which require frequent adjustment and replacement, and high power consumption. Electric light bulbs have also been used for this purpose. Such bulbs do not give a uniform field of light source and are of comparatively low light intensity and therefore require long exposure periods. It is one of the objects of the present invention to provide an improved light source for such contact printing apparatus.

The part of the solar spectrum which is most visible to the eye is not the same part that has the greatest photographic effect. For instance, the human eye is most sensitive to the part of the spectrum which centers around the green and yellow-green, that is, around 5500 Angstrom units. The usual photographic emulsions are most sensitive to that part of the spectrum from 3300 to 4500 Angstrom units, centering around approximately 3800 Angstrom units. With this in mind it is one of the objects of the present invention to provide a light source which is richest in the rays centering about 3800 Angstrom units. In order to produce such a light source I have found it expedient to use a fluorescent type of glow discharge lamp wherein the fluorescent materials used are such as are most effective in the portion of the spectrum to which photographic emulsions are most sensitive, in other words, fluorescent material which will produce light rich in the blue and violet. I have found that calcium tungstate, magnesium tungstate, and the like, which contain controlled impurities, are very effective for this purpose. This material in finely powdered form is coated into tubing of diameters in the neighborhood of 12 to 15 millimeters, which tubing is preferably of material which will pass ultra-violet rays, particularly near ultra violet rays.

The glow discharge tube is preferably one which contains mercury. Mercury is resonant at approximately 2537 Angstrom units. Rays of this wave length do not appreciably affect the usual photographic emulsions. They do, however, affect the fluorescent coating of calcium tungstate or magnesium tungstate which include controlled impurities which make it fluoresce. Thus the rays of those wave lengths are utilized by the fluorescent material to produce photographic affecting rays. That portion of the spectrum produced by the tube which has a frequency above approximately 3100 Angstrom units passes through ultra violet ray transparent tubes and directly affects the photographic emulsion. Thus the light source used in accordance with the present invention utilizes all of the available rays by converting those rays which normally would be ineffective into effective rays.

The light source of the photographic printing apparatus of the present invention may be of the hot cathode type or of the cold cathode type. Cold cathode type of apparatus usually requires a very high voltage, which is objectionable. Hot cathode type of apparatus is generally open to the objection that the illumination does not commence instantly upon closing of the circuit and therefore the problem of timing the photographic exposure is complicated. In photographic printing work it is necessary that the light sensitive paper or emulsion be exposed to light a fixed period of time, which may vary from a few seconds to a number of minutes, depending upon the kind of paper or light sensitive surface used, the condition of the negative, the intensity of the light, the desired darkness of the print, etc. If, for instance, a total exposure time of five seconds is indicated, then a deviation of three seconds in the starting time of the hot cathode tube will produce an error of sixty per cent in the time of exposure of the photographic surface. It is one of the objects of the present invention to provide a control circuit for hot cathode discharge tubes, for photographic lighting units, wherein the time required for starting the light emitting arc is reduced to substantially zero, or to such a small time interval as to be negligible, whereby the time of exposure of the photographic emulsion may be accurately controlled by controlling the interval between closing and opening of the power circuit for the glow discharge lamps.

In accordance with one embodiment of the present invention the light source consists of a number of hot cathode tubes. Each tube includes two filaments, one at each end thereof, as is usual in hot cathode tubes. The filaments are permanently connected to a power source which is of sufficient voltage to maintain the filaments heated to their requisite temperature but of insufficient voltage to cause an arc to form between the electrodes or to maintain such an arc once it is formed by other causes. The tubes are thus permanently in condition for arc formation therethrough immediately upon the application thereto of the requisite arcing voltage. This is supplied from a separate power transformer controlled by a power switch. Thus, whenever the power switch is closed the arcing voltage is applied to the already heated filaments or cathodes so that the arc forms instantly. Upon opening of the power switch the arc will be extinguished instantly. Thus, when the unit is used for photographic printing the filaments are permanently connected in the circuit. When the paper or other printing equipment is positioned for printing work the power switch is closed and maintained closed for the requisite exposure period, thereby maintaining the lighting arc during the full exposure period.

In the preferred embodiment of the present invention the power circuit of each tube includes a current limiting reactor in series with the tube. If any one tube should fail or become broken there will be no appreciable increase in the current flowing through the remaining tubes because of the current limiting reactors in series with each of the remaining tubes. If desired the current limiting reactors individual to the respective tubes could be omitted and a single reactor connected in the primary circuit of the power transformer, which reactor would be arranged to produce a diminution of the current output in response to a failure of a tube, which diminution would be in proportion to the number of tubes in the circuit, so that resulting current flow through the remaining undamaged tube will remain the same.

While in the preferred embodiment of the present invention the power circuits are individually energized from different taps of the power transformer, this is not indispensable. For instance, the power circuits of the respective tubes may be connected in series. A short circuiting device may be connected across the power circuit of each tube of the series, which short circuiting device is so arranged as to become operative only when and if its associated tube fails. This will prevent extinguishment of all of the tubes upon failure of one of them.

The attainment of the above and further objects of the present invention will be apparent from the following specification taken in conjunction with the accompanying drawings forming a part thereof.

In the drawings:

Figure 1 is a side view of a contact photoprinting apparatus embodying the present invention;

Figure 2 is a front view of the apparatus of Figure 1;

Figure 3 is a bottom view of the head of Figure 1;

Figure 4 is a sectional view taken along the line 4—4 of Figure 2 and looking in the direction of the arrows;

Figure 5 is a sectional view taken along the line 5—5 of Figure 4 and looking in the direction of the arrows;

Figure 6 is a plan view of a pair of hot cathode tubes embodying the present invention;

Figure 7 is an end view of the tubes of Figure 6;

Figure 8 is a diagrammatic view of a control circuit of the present invention; and Figure 9 is a diagram of a modified circuit arrangement corresponding to that of Figure 8.

Reference may now be had more particularly to Figures 1 to 4 of the drawings. In these figures I have illustrated a contact type photoprinting machine to which my invention is applied. The photoprinting machine comprises a table 1 including four legs 2, one at each corner of the table, and a top 3. The top supports a substantially rectangular frame 4 in which is mounted an inflatable rubber bag 5 adapted to be inflated by air pressure through an inlet 6. A transparent plate 7 is hinged at 8' to the frame 4 and overlies the back 5. The negative from which the print is to be made, and the photosensitive paper upon which the print is to be made, are placed on top of the bag 5 and covered by the transparent plate 7, as is standard and well known in the art of contact photoprinting. The plate 7 is of glass-like appearance but is preferably not made of glass because glass is opaque to ultraviolet light. In the preferred construction the transparent plate 7 is made of material transparent to the visible light and transparent to ultraviolet light. Quartz is one suitable material. Usually, however, the cost of a quartz plate would be prohibitive so therefore a cheaper material is used, such as one of the many known thermoplastic materials that are transparent to ultraviolet light. Lucite is one such material.

An illuminating head 15 is pivoted to the table 1 by a hinge 16 and is movable from the position illustrated in full lines in Figure 1 to the position illustrated in dotted lines therein. The head consists of a box substantially rectangular in shape, closed at the top and open at the bottom, and in which the light source is mounted. The light source consists of a number of glow discharge tubes which may be cold cathode tubes or may be hot cathode tubes.

In the embodiment illustrated in Figures 1 to 4 I have shown the light source as consisting of four lamps of the glow discharge type. The lamps are of identical construction and are indicated at 8, 9, 10 and 11. Each lamp consists of a continuous length of tubing of the requisite diameter bent upon itself to constitute four parallel side by side lengths, the ends of the tube being then bent out as indicated at 17—17 and provided with sealing terminals 18—18. The tubes are of the usual cold cathode glow discharge type and are evacuated to the requisite vacuum and contain the proper amount of mercury and are coated with a finely divided fluorescent powder on the inside. The terminals 18 include, on the inside of the tube, the usual electrodes. The material of which the tubes 8 are made is preferably material transparent to ultraviolet rays. The fluorescent coating is preferably calcium tungstate, magnesium tungstate, or the like, which contains controlled impurities which causes the material to fluoresce when subjected to short ultraviolet rays. The tube is constructed so that the rays emitted therefrom are of a low intensity in the green and yellow portion of the spectrum and of a high intensity in the portion of the spectrum between 3300 and 4500 Angstrom units, centering around 3800 Angstrom units.

The head 15 is provided with a reflector 20 preferably of the type which efficiently reflects ultraviolet rays, which reflector is in the shape of a plate having a series of adjacent V-shaped grooves stamped therein. The lamps are mounted so that each length of a lamp is opposite an apex of one of the V grooves of the reflector 20. The lamps 8, 9, 10 and 11 are mounted in position between the reflector and mounting strips 22—22 that are secured to the base of the head 15. The sealing terminals 18 extend through a partition 24 in the head 15 and are electrically connected together to place the members 8, 9, 10 and 11 in series circuit with one another. An electric switch 26 is mounted in the head 15 and is arranged to be closed by a plunger of the switch engaging the frame 4 when the head 15 is lowered to its operative position, illustrated in Figure 1. This switch controls the circuit of the glow discharge members and closes that circuit immediately upon closure of the head to the position illustrated in Figure 1, so that the members 8—11 light immediately upon, and only upon, closure of the head. A timer switch 27, which may be set manually to operate at any given time interval, is mounted on the table 1 and commences operation immediately upon closure of the switch 26 or upon closure of the head 15. This switch is connected in circuit with the switch 26 and interrupts that circuit after a predetermined time interval for which the timer has been set. Thus the photographic emulsion is exposed to light a fixed period of time commencing with the closure of the switch 26 and continuing until the timer switch 27 operates to open the circuit. The photographic surface may thus be exposed for a definitely fixed period of time. A step-up power transformer 30 is mounted on the table 1 in any convenient position and furnishes the power for operating the lamps.

While I have illustrated Figures 1 to 4 as utilizing a cold cathode type of lamp, it is within the purview of the present invention to use a hot cathode type of lamp. When such a lamp is used it is preferable to use tubing of shorter lengths. A hot cathode type of lamp may be used in lieu of the lamps 8, 9, 10 and 11, as illustrated at 40 and 41 of Figures 6 and 7. The lamp is made of glass-like material which is transparent to ultraviolet rays as heretofore, and is coated with the fluorescent material as heretofore mentioned. Each lamp 40—41 is bent into U-shape, as illustrated in Figure 6, so that it has two arms 42—43 joined by a continuous bight portion 44 which lie in one plane. The ends 45—45 of the lamp 40 are bent at right angles to the arms 42—43. Likewise the ends 46 of the lamp 41 are bent at right angles to its arms. Each lamp terminates in a sealing terminal 48 of the type usual in hot cathode tubes. Each end of the lamp 40 is provided with two filaments which are supplied with electric current for heating an electrode that constitutes the cathode of the tube. The filaments are generally located on the inside of the cathode. Two lamps 40—41 are mounted in the manner illustrated in Figure 6 with the arm of one lamp extending into the space between adjacent arms of the other lamp. This constitutes a unit. A number of such units are mounted in the head 15 in the same manner as are the lamps 8, 9, 10 and 11 of Figure 3.

It is known that the cathode of a hot cathode tube must be heated to a sufficiently high temperature before a glow discharge arc can be started in the tube. The requisite time interval for this heating is highly variable, depending upon a large number of factors. In contact printing photo apparatus it is necessary that the light be applied at a definitely controlled time. I therefore provide an electric circuit as illustrated, for instance, in Figure 8, for accomplishing this result. This circuit is so arranged that the filaments of the respective lamps are maintained hot at all times so that the glow discharge arc can be formed through the tubes instantly upon closing of the power circuit provided for that purpose.

Reference may now be had more particularly to Figure 8, which shows a circuit for use with the light illuminating means of Figures 6 and 7. In this circuit the tubes indicated at 51 to 56 inclusive are of the construction illustrated in Figures 6 and 7. The tubes 51 and 52 are nestled together in the manner illustrated in Figures 6 and 7. Likewise the tubes 53 and 54 are thus nestled together, as are the tubes 55 and 56, thus making three grids of two tubes per grid. Each tube has two cathodes, indicated at 58 and 59, in the form of filaments, which cathodes are located on the inside of a metal tube 60 open at both ends, which constitutes the electron emitting surface. This is a well known type of cathode construction, it being understood that any other type of cathode may be used.

The circuit for energizing the tubes is indicated diagrammatically and includes a manually operated power switch 62, in this instance in the form of a double pole switch, which connects the apparatus to an alternating current line 63 which may be a standard 60 cycle 110 volt line. A small pilot lamp 64 is provided for indicating the energized or deenergized condition of the apparatus. The switch 62 connects the source of power to a filament transformer 65 which includes a primary 66 and a number of separate identical secondary windings 67 on the same iron core. Each secondary winding is electrically separate from the remaining secondary windings, the secondaries being of identical construction. The secondaries supply power for the respective filaments of the electric light tubes 51 to 56 inclusive, each secondary energizing one filament. Thus upon closure of the switch 62 all of the filaments of all of the tubes 51 to 56 are energized. The cathodes are thus heated but no glow discharge starts because the voltage between cathodes of the same tube is negligible, certainly insufficient to start or even to maintain the arc between the cathodes 60 of a tube.

Closure of the power switch 62 also energizes a line 70 which energizes a standard time relay circuit 71 so that from ten to twenty seconds after energization of the line 70 the time relay switch 71 includes a bimetallic contact actuating element 72 energized by a heater 73 to close a contact 74 from ten to twenty seconds after energization of the heater 73. Closure of the contact 74 completes a circuit for a locking relay 75 by way of one line conductor 70, through conductor 76, contact 74 and conductor 77, to the winding of the relay, thence to the opposite line conductor 70. Immediately upon operation of the relay 75 its contact spring 78 at its back contact 79 opens the circuit for the heater 73 and at its front contact 81 closes a locking circuit for the winding of the relay 75. Thus once the relay 75 is operated it locks itself in its operated position where it remains until released by opening of the manual power switch 62. Operation of the relay 75 further causes closure of the switch spring 82 to close its contact 83 and thus energize the line 80. The line 80 extends the power circuit to the switch 26, which switch is normally open and adapted to be closed upon closure of the head 15 of the photoprinting apparatus. Closure of the switch 26 establishes a circuit to the primary 86 of a step-up power transformer 85 through a circuit which includes an iron-core choke 84 if a manual switch 98 is closed at its contact 98', or which excludes the choke if the switch 98 is closed at its contact 99. The power transformer 85 has a plurality of identical separate secondaries 87, 88, 89, 90, 91 and 92 mounted on an iron core structure energized by the primary winding 86. Closure of the switch 26 also establishes a circuit for a power factor correcting condenser 93 in shunt with the primary 86. The secondaries 87 to 92 are connected each to one of the tubes or lamps 51 to 56 inclusive by identical circuits so that a description of one will suffice also for the others. The secondary 87 is connected through a current limiting reactor or choke 95 and a conductor 96 to one terminal of the tube 51. The other side of the transformer winding 87 is connected by a conductor 97 to the other terminal of the tube 51. The filaments 58 and 59 of the tube 51 are electrically connected to the cathodes 60. Thus the conductor 96 connects to one cathode 60 whereas the conductor 97 connects to the opposite cathode 60 of the same tube. When the power transformer 85 is energized the secondary 87 applies a voltage of approximately 350 volts across the conductors 96—97. This is sufficient to cause an arc to form between the hot cathodes 60—60 of the tube 51. Once the arc has formed the current flowing through the arc and through the iron core reactor or choke 95 reduces the voltage to a value sufficient to maintain the arc. As soon as the manually actuated power switch is opened the voltage between the electrodes is insufficient to maintain the arc and the arc goes out instantly. Thus the duration of the arc, and the duration of the exposure of the photographic surface is accurately controlled. Should any one of the tubes 51 to 56 inclusive fail, the reactances 95 in the circuits of the remaining tubes will be effective to prevent an abnormal rise of current in the remaining tubes.

In the normal operation of the apparatus of Figure 8 the operator closes the switch 62 which starts the heating of the cathodes. Ten or twenty seconds thereafter the line 80 becomes energized and the photoprinting apparatus is then in condition for starting of operations. After each printing operation the operator opens the head 15 but does not open the switch 62. Thus the switch 26 is opened after each printing operation to extinguish the lights but the switch 62 remains closed so that the apparatus remains in condition for instantaneous starting for each successive printing operation of the machine.

The transformer 85 is so constructed that when the primary receives its rated applied voltage the maximum current that can flow, when the secondary is short circuited, is 800 milli-amperes. This is the maximum current value when the manual switch 98 is closed at its contact 99' so that the choke 84 is not in the circuit. If the manual switch 98 is operated to close the contact 99' instead of 99 so as to include the choke 84 in series with the primary 86 of the transformer it limits the current to a maximum of 300 milli-amperes as the value of the short circuiting current. When the transformer is carrying the required load (not short circuited) the current is 630 milli-amperes when the choke 84 is not in circuit and 200 milli-amperes when the choke 84 is in circuit. This gives two different values of light output intensity the higher of which is exactly double the intensity of the lower light output. Thus the switch 98 controls the intensity of illumination of the tubes 51—56.

A lighting unit of the above mentioned character is useful in the photoprinting and photoengraving arts not only for contact printing but also as a source of illumination for enlarging or reducing color separation and in general to replace the arc lamp as now used. The lamps are so connected in the circuit that after the unit is once started and the cathodes 58—60 heated the cathodes are maintained hot so long as the switch 62 remains closed, whereas the light producing arc can be instantly stopped or started by opening or closing the switch 26. This allows for instant starting of the illumination and therefore permits accurate timing of the exposure period.

While in Figure 8 I have shown an arrangement wherein the power circuits of the respective tubes are energized from separate secondary windings on the power transformer 85, this is not an indispensable part of the present invention. For instance, the power circuits of the tubes may be connected in series so that they are all energized from a single secondary on the power transformer. This arrangement is illustrated in Figure 9. Insofar as the parts of Figure 9 are the same as those of Figure 8 identical reference numerals have been used. A description of those parts is therefore not necessary at this time. In this case the step-up power transformer is indicated at 85' and includes a single primary 86 and a single secondary 100. One side of the secondary 100 is connected by a conductor 101 to the cathode of the tube 51. The opposite side of the secondary 100 is connected by a conductor 102 to the cathode of the tube 56. The power circuit extends by way of the conductor 101, through the tube 51 and conductor 103, conductor 104, conductor 105, thence one cathode of the tube 52, thence through the tube 52 to the opposite cathode thereof, and conductors 106, 107 and 108 to one cathode of the tube 53, thence through the tube 53 to conductor 109 and from that tube through the tubes 54, 55 and 56 through connections similar to the connections between the tubes 51—52 or 52—53.

Each tube is shunted by a safety device 120 which is normally open circuited and is adapted to short circuit in the event of the establishment of an excessive voltage across it. The device 120 may be of the type shown in the patent to Hill, No. 1,963,366, issued June 19, 1934, or of the type illustrated in the patent to McCombes, No. 1,884,789, issued October 25, 1932. Under normal operating conditions this device is and remains open circuited and therefore of no effect. This device 120 preferably comprises a gas filled tube having a definite breakdown potential which is somewhat greater than the breakdown potential of the particular glow discharge tube 51—56 which it shunts. Normally the current takes the path through the luminous tube since this path has less resistance. Upon failure of one of the luminous tubes 51—56 the resistance of the defective tube becomes greater and the current then flows through the safety device which shunts the defective tube. Because of the high voltage and the small current ordinarily employed the increase in resistance does not materially affect the circuit. The load output of the power transformer 85' is thus maintained.

Should any one of the lamps 51—56 fail it will prevent completion of the power circuit in the secondary of the transformer 100. As a result, the very high voltage of the secondary 100 will be applied across the one defective tube and thus applied across the corresponding safety device 120. This device breaks down to establish a short circuit therethrough, thus short circuiting the defective lamp and permitting the arc to form through the remaining lamps. This will not only indicate the defective lamp for replacement but will also permit operation of the photoprinting apparatus until such time as the defective lamp is replaced.

While Figures 1 to 7 inclusive show one preferred manner of mounting the lamps for a machine to be used in the contact printing art, it is within the purview of the present invention to use the principles hereof for general illumination wherever a photographic arc was previously used. A plurality of lamps, such as the lamps 51—53, may be used as individual units mounted close together, with or without a reflector, to form a complete portable lighting unit. The transformers, auxiliary switches, condenser, etc., may be placed in a base which also carries the lighting unit which provides illumination for photographic or other purposes. The switch 26 is manually closed to produce instant illumination and opened to produce instant extinguishment of the light-producing arc, while the starting switch 62 remains closed, thus maintaining the unit in condition for instant lighting.

In compliance with the requirements of the patent statutes I have herein shown and described a few preferred embodiments of the present invention. It is, however, to be understood that the invention is not limited to the precise constructions or circuits here shown, the same being merely illustrative of the principles of the invention. What is considered new and desired to be secured by Letters Patent is:

1. In a lighting apparatus, a light source comprising a hot cathode type of glow discharge device having electrodes at each end between which a light producing discharge takes place, heating means for the electrodes, a heating circuit for the heating means, a discharge circuit for the glow discharge device, delayed action automatic means energized in response to closure of the heating circuit for connecting the discharge circuit to a source of power, and means for interrupting the discharge circuit independently of the heating circuit, said last means including a manually controlled switch in the discharge circuit for controlling completion of the energization of the discharge circuit and opening of the discharge circuit, whereby repeated actuations of the switch after an initial closure of the heating circuit and initial operation of the delayed action means results in repeated instantaneous formations of and extinguishments of the light producing glow discharge.

2. In combination, a light source comprising a hot cathode type of glow discharge device having electrodes at each end between which the discharge takes place, heating means for the electrodes, a heating circuit for the heating means, a discharge circuit apart from the heating circuit, time delay means in said discharge circuit for delaying the possible energizing of the discharge means until after the electrodes have been heated to their operating temperature, said heating circuit being maintained closed independently of the closing and subsequent opening of the discharge circuit, and means for controlling the energization and deenergization of the discharge circuit while the heating circuit remains energized.

3. In combination, a light source comprising a hot cathode type of glow discharge device having electrodes at each end between which the discharge takes place, heating means for the electrodes, a heating circuit for the heating means, a discharge circuit apart from the heating circuit, time delay means controlling said discharge circuit for delaying the possible energizing of the discharge means, said time delay means including means controlled from the heating circuit for controlling the operation of the time delay means, said heating circuit being maintained closed independently of the closing and subsequent opening of the discharge circuit, and a manually controlled switch in the discharge circuit for controlling the energization and deenergization of the discharge circuit, said time delay means including means for locking the time delay means in its operated position upon the initial operation thereof following the energization of the heating circuit and maintaining it locked so long as the heating circuit remains energized so that after such initial operation of the time delay means the discharge circuit is under the instantaneous control of the manual switch.

4. In a lighting system, the combination with a plurality of hot cathode tubes, a transformer for energizing the cathodes of all of the tubes, said transformer furnishing potential to the respective tubes of a magnitude insufficient to start or to maintain an illuminating discharge through the tubes, and separate means for applying to the tubes a potential sufficient to start an illuminating discharge therethrough instantly, said last named means including switching means for controlling the application and the removal of the last named potential while leaving the cathodes energized, and time delay means for rendering said switching means ineffective for a time interval after the commencement of energization of the cathodes.

5. In a lighting system the combination with a hot cathode glow discharge tube, cathode heating means, said means being incapable of starting and incapable of maintaining an illuminating discharge through the tube, means for applying to the tube a potential sufficient to start an illuminating discharge therethrough instantly, said last named means including switching means for controlling the application and removal of said potential while leaving the cathode heating means effective, and time delay means controlled by the cathode heating means for rendering said switching means ineffective for a time interval after the commencement of the operation of the cathode heating means.

6. In combination, a light source comprising a hot cathode type of glow discharge tube, a cathode heating circuit, a discharge circuit, time delay means controlled by the heating circuit and controlling the discharge circuit for delaying operation of the discharge circuit for a time interval following initiation of operation of the heating circuit, means for controlling the opening and closing of the discharge circuit, said cathode heating circuit being maintained closed independently of the closing and subsequent opening of the discharge circuit, so that after initial operation of the time delay means the discharge circuit may be instantly and repeatedly energized and deenergized by operation of the said means for controlling the opening and closing of the discharge circuit.

OSCAR H. FLOYD.